(12) United States Patent
Wang et al.

(10) Patent No.: US 12,121,048 B2
(45) Date of Patent: Oct. 22, 2024

(54) COMBINED REFRIGERATION AND HEATING DEVICES FOR FOOD INDUSTRY AND USE METHODS THEREOF

(71) Applicant: HEFEI UNIVERSITY OF TECHNOLOGY, Anhui (CN)

(72) Inventors: Zhaoming Wang, Hefei (CN); Yuanbo Hu, Hefei (CN); Baocai Xu, Hefei (CN); Hui Zhou, Hefei (CN); Kezhou Cai, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/391,705

(22) Filed: Dec. 21, 2023

(65) Prior Publication Data
US 2024/0210076 A1 Jun. 27, 2024

(30) Foreign Application Priority Data

Dec. 26, 2022 (CN) .......................... 202211673094.X

(51) Int. Cl.
*A23L 3/36* (2006.01)
*A23L 3/04* (2006.01)
(Continued)

(52) U.S. Cl.
CPC ................. *A23L 3/04* (2013.01); *A23L 3/361* (2013.01); *A23B 4/005* (2013.01); *A23B 7/005* (2013.01); *F26B 23/005* (2013.01)

(58) Field of Classification Search
CPC ... A23L 3/04; A23L 3/36; A23L 3/361; A23L 3/40; A23B 4/005; A23B 7/005; A23B 7/024
(Continued)

(56) References Cited

U.S. PATENT DOCUMENTS 3,718,082 A * 2/1973 Lipoma ..................... A23L 3/04
99/477
5,909,943 A 6/1999 Poirier et al.
(Continued)

FOREIGN PATENT DOCUMENTS

CN 108946049 A 12/2018
CN 113180176 A 7/2021
(Continued)

OTHER PUBLICATIONS

Tao, Lei, Application Technology of Using Waste Heat of Alcohol Production Line in Refrigeration System, Chinese Master's Theses Full-text Database, 2022, 58 pages.
(Continued)

*Primary Examiner* — Reginald Alexander
(74) *Attorney, Agent, or Firm* — Porus IP LLC

(57) ABSTRACT

The present disclosure provides a combined refrigeration and heating device for food industry and a use method thereof. The combined device comprises a refrigeration device and a heating device connected through a waste heat recovery and utilization system. The heating device includes a heating cavity and a heating plate. A first conveyor belt is disposed in the heating cavity. A left end and a right end of the heating cavity are provided with a slanting cavity, respectively. The slanting cavity disposed at the right end of the heating device is provided with a second conveyor belt. A left end of the refrigeration device is provided with a slanting cavity. More than two blocking devices are disposed in the slanting cavity disposed at the left end and the right end of the heating device and the slanting cavity disposed at the left end of the refrigeration device.

10 Claims, 4 Drawing Sheets

(51) Int. Cl.
  *A23B 4/005* (2006.01)
  *A23B 7/005* (2006.01)
  *F26B 23/00* (2006.01)

(58) Field of Classification Search
  USPC ...... 99/357; 62/331; 34/62, 65, 66, 391, 393
  See application file for complete search history.

(56) References Cited

U.S. PATENT DOCUMENTS

| | | | | |
|---|---|---|---|---|
| 7,285,299 | B1* | 10/2007 | Howard | A23L 3/04 |
| | | | | 426/399 |
| 2005/0103910 | A1 | 5/2005 | Zweben | |
| 2005/0132899 | A1 | 6/2005 | Huang et al. | |
| 2012/0000090 | A1* | 1/2012 | Muhlherr | F26B 15/126 |
| | | | | 34/493 |
| 2018/0325147 | A1* | 11/2018 | Concin | A23L 3/04 |
| 2022/0361514 | A1* | 11/2022 | Ota | A23L 27/16 |

FOREIGN PATENT DOCUMENTS

| | | | |
|---|---|---|---|
| JP | 2002318052 A | 10/2002 | |
| JP | 2010185645 A | 8/2010 | |

OTHER PUBLICATIONS

Decision to Grant a Patent in Chinese Application No. 202211673094.X mailed on Jun. 6, 2023, 6 pages.

\* cited by examiner

COMBINED REFRIGERATION AND HEATING DEVICES FOR FOOD INDUSTRY AND USE METHODS THEREOF

CROSS-REFERENCE TO RELATED APPLICATIONS

This application claims priority to Chinese Patent Application No. 202211673094.X, filed on Dec. 26, 2022, the entire contents of which are incorporated herein by reference.

TECHNICAL FIELD

The present disclosure relates to the field of refrigeration device, and in particular, to a combined refrigeration and heating device for food industry and a use method thereof.

BACKGROUND

A food industry refers to an industrial sector that manufactures foodstuffs through physical treatment by using agricultural and sideline products, or by utilizing yeast fermentation. Raw materials used in the food industry are mainly primary products produced by agriculture, forestry, animal husbandry, fishery, and by-product sectors.

In the food industry, foodstuffs are sometimes subjected to freezing or refrigeration treatment. However, during a heat and cold exchange process of a refrigeration system, the generated heat is not fully utilized. In addition, when foodstuffs enter the freezing or refrigeration device, a loss of cold air may occur, resulting in poor freezing or refrigeration effects and energy waste.

Therefore, it is desirable to provide a combined refrigeration and heating device for food industry and a use method thereof.

SUMMARY

One of the embodiments of the present disclosure provides a combined refrigeration and heating device for food industry. The device may comprise a refrigeration device connected with a heating device through a waste heat recovery and utilization system. The heating device may be provided with a heating cavity. A first conveyor belt may be disposed in the heating cavity. A top surface of the heating cavity may be provided with a heating plate. The heating plate may be configured to cooperate with the waste heat recovery and utilization system. A left end and a right end of the heating cavity may be provided with a slanting cavity, respectively. The slanting cavity disposed at the right end of the heating device may be provided with a second conveyor belt. A right end of the second conveyor belt may correspond to the refrigeration device. A left end of the refrigeration device may be provided with a slanting cavity. The slanting cavity may correspond to the right end of the second conveyor belt. A refrigeration system may be disposed in the refrigeration device. The refrigeration system may cooperate with the waste heat recovery and utilization system. More than two blocking devices may be disposed in the slanting cavity disposed at the left end and the right end of the heating device and the slanting cavity disposed at the left end of the refrigeration device, respectively. For each of the more than two blocking devices, the blocking device may include a baffle plate. A middle of the baffle plate may be provided with a through-groove. A top end of a right side of the baffle plate may be hinged with a plurality of blocking strips through a plurality of torsion springs, respectively. The plurality of blocking strips are capable of blocking the through-groove. A top end of the baffle plate may be connected with a plurality of connecting blocks. The plurality of connecting blocks may be disposed in a long groove. The long groove may be disposed in a mounting plate. The plurality of connecting blocks may be configured to penetrate through the long groove and to be connected with a plurality of linear actuators. The plurality of linear actuators are capable of driving the baffle plate to move along the slanting cavity disposed at the left end and the right end of the heating device and the slanting cavity disposed at the left end of the refrigeration device. The linear actuators may be fixedly mounted on the mounting plate. A mounting cavity may be provided above the slanting cavity disposed at the left end and the right end of the heating device and the slanting cavity disposed at the left end of the refrigeration device, respectively. A partition plate may be provided between the mounting cavity and the slanting cavity disposed at the left end and the right end of the heating device and between the mounting cavity and the slanting cavity disposed at the left end of the refrigeration device, respectively. The mounting plate may be mounted on the partition plate. The plurality of linear actuators may be disposed in the mounting cavity.

One of the embodiments of the present disclosure provides a use method of a combined refrigeration and heating device for food industry. The method may be implemented on any one of the combined refrigeration and heating device for the food industry. The use method may comprise delivering a foodstuff from the slanting cavity disposed at the left end of the heating device, wherein the foodstuff may be configured to prop open the plurality of blocking strips due to gravity, and fall onto a first conveyor belt inside the heating cavity, the first conveyor belt may be configured to convey the foodstuff, and a heating plate may be configured to perform a sterilizing and drying operation on the foodstuff. The use method may also comprise conveying the foodstuff to the slanting cavity disposed at the right end of the heating device through the first conveyor, wherein the foodstuff may be configured to prop open the plurality of blocking strips due to the gravity, and fall onto a second conveyor belt, the second conveyor belt may be configured to convey and cool the foodstuff. The use method may further comprise conveying the foodstuff to the slanting cavity disposed at the left end of the refrigeration device through the second conveyor, wherein the foodstuff may be configured to prop open the plurality of blocking strips due to the gravity, and enter into the refrigeration device for freezing or refrigerating.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein.

DETAILED DESCRIPTION

Figure 1:
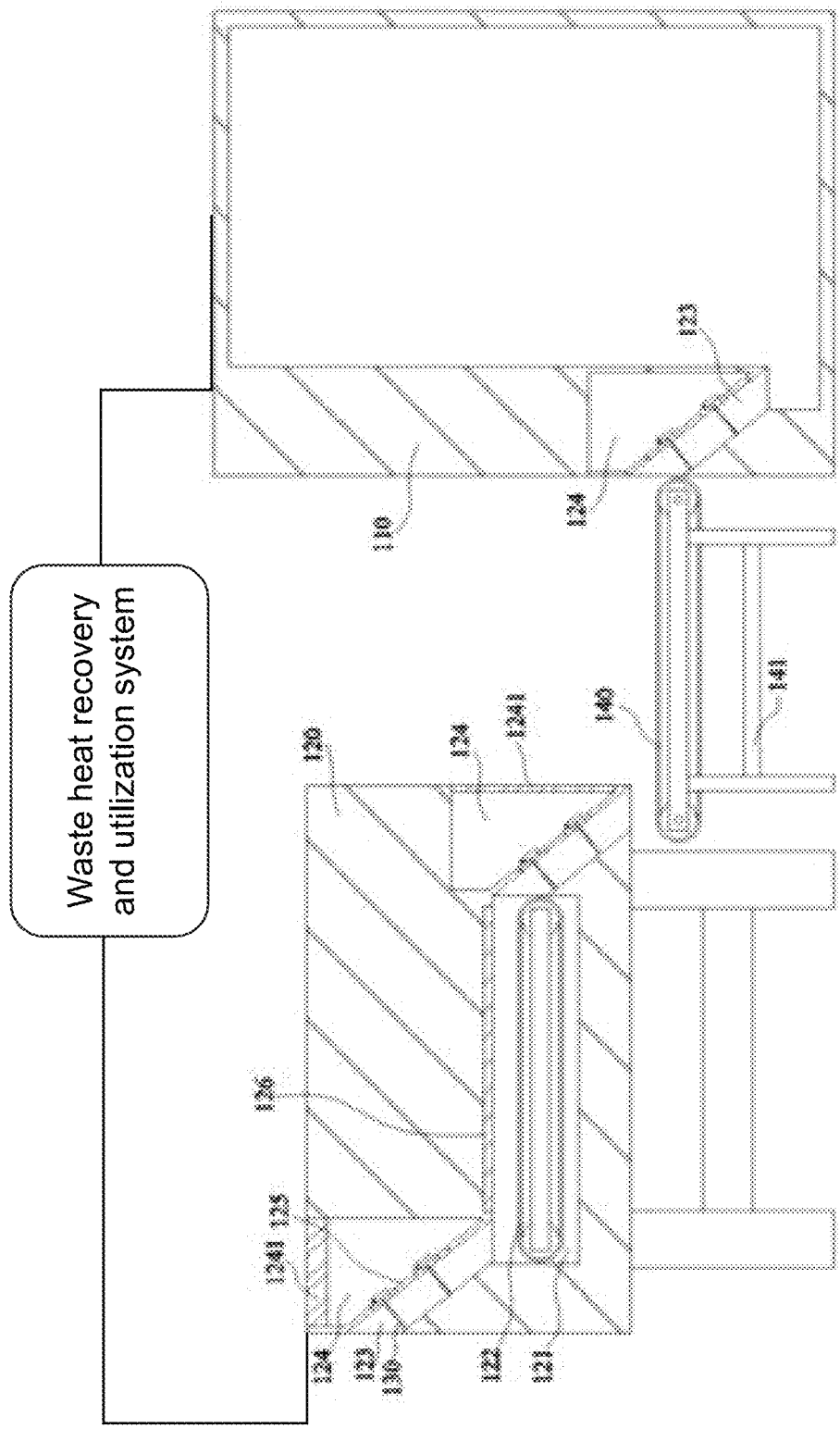
FIG. 1 is a schematic diagram illustrating a structure of a combined refrigeration and heating device for food industry according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

In some embodiments, a combined refrigeration and heating device for food industry may comprise a refrigeration device connected with a heating device through a waste heat recovery and utilization system. The heating device may be provided with a heating cavity. A first conveyor belt may be disposed in the heating cavity. A top surface of the heating cavity may be provided with a heating plate. The heating plate may be configured to cooperated with the waste heat recovery and utilization system. A left end and a right end of the heating cavity may be provided with a slanting cavity, respectively. The slanting cavity disposed at the right end of the heating device may be provided with a second conveyor belt. A right end of the second conveyor belt may correspond to the refrigeration device. A left end of the refrigeration device may be provided with a slanting cavity. The slanting cavity may correspond to the right end of the second conveyor belt. A refrigeration system may be disposed in the refrigeration device. The refrigeration system may cooperate with the waste heat recovery and utilization system. More than two blocking devices may be disposed in the slanting cavity disposed at the left end and the right end of the heating device and the slanting cavity disposed at the left end of the refrigeration device, respectively. For each of the more than two blocking devices, the blocking device may include a baffle plate. A middle of the baffle plate may be provided with a through-groove. A top end of a right side of the baffle plate may be hinged with a plurality of blocking strips through a plurality of torsion springs, respectively. The plurality of blocking strips are capable of blocking the through-groove. A top end of the baffle plate may be connected with a plurality of connecting blocks. The plurality of connecting blocks may be disposed in a long groove. The long groove may be disposed in a mounting plate. The plurality of connecting blocks may be configured to penetrate through the long groove and to be connected with a plurality of linear actuators. The plurality of linear actuators are capable of driving the baffle plate to move along the slanting cavity. The linear actuators may be fixedly mounted on the mounting plate. A mounting cavity may be provided above the slanting cavity disposed at the left end and the right end of the heating device and the slanting cavity disposed at the left end of the refrigeration device, respectively. A partition plate may be provided between the mounting cavity and the slanting cavity disposed at the left end and the right end of the heating device and between the mounting cavity and the slanting cavity disposed at the left end of the refrigeration device, respectively. The mounting plate may be mounted on the partition plate. The plurality of linear actuators may be disposed in the mounting cavity.

The combined refrigeration and heating device for the food industry is further illustrated with reference to the accompanying drawings.

FIG. 1 is a schematic diagram illustrating a structure of a combined refrigeration and heating device for food industry according to some embodiments of the present disclosure.

In some embodiments, as illustrated in FIG. 1, the combined refrigeration and heating device for the food industry may include a refrigeration device 110. The refrigeration device 110 may be used for refrigeration or freezing of a foodstuff. The refrigeration device 110 may be connected with a heating device 120 through a waste heat recovery and utilization system. The heating device 120 may be used to provide heat for performing a sterilizing and drying operation on the foodstuff before a refrigeration or freezing operation is performed.

In some embodiments, the heating device 120 may be provided with a heating cavity 121. A first conveyor belt 122 may be disposed in the heating cavity 121. A top surface of the heating cavity 121 may be provided with a heating plate 126. The heating plate 126 may be configured to cooperate with the waste heat recovery and utilization system.

In some embodiments, a refrigeration system may be disposed in the refrigeration device 110. The refrigeration system may be configured to cooperate with the waste heat recovery and utilization system.

The refrigeration system refers to a device that cools a space within the refrigeration device 110, such as a compressor or a semiconductor refrigeration device. In some embodiments, the refrigeration system may be a $CO_2/NH_3$ cascaded refrigeration system, which is energy efficient and environmentally friendly with a high safety factor.

The waste heat recovery and utilization system refers to a system configured to collect and utilize waste heat generated during an operation of the refrigeration device 110, such as a heat exchanger, a waste heat utilization boiler, etc.

The refrigeration system in the refrigeration device 110 may be used to transfer heat to the heating plate 126 in the heating device 120 through the waste heat recovery and utilization system, and the heating plate 126 may be used to heat the heating cavity 121. In this case, the heating cavity 121 may perform a low-temperature sterilizing and drying operation on the foodstuff disposed therein. After the low-temperature sterilizing and drying operation is completed, the first conveyor belt 122 may be used to transfer the foodstuff to a second conveyor 140 for cooling, and then to the refrigeration device 110 for freezing or refrigerating.

With the waste heat recovery and utilization system, the waste heat generated in the refrigeration device 110 may be used for the sterilizing and drying operation before freezing or refrigeration, combining refrigeration and heating to foodstuff treatment, which is very convenient and energy-saving.

In some embodiments, if a higher temperature is desired within the heating cavity 121, the heating cavity 121 may be provided with other heating devices, such as an electric heating device.

In some embodiments, the heating cavity 121 may be further provided with a hot air inlet of the waste heat recovery and utilization system. Rotating fan blades may be provided within the hot air inlet. In some embodiments, the heat generated by the refrigeration device 110 may be fed into the heating cavity 121 in the form of hot air, thereby further recovering heat and saving energy.

For example, when the refrigeration device 110 is a compressor, the compressor may generate heat during operation. Surrounding hot air of the compressor may be extracted by an extraction device (e.g., an extraction pump) and input into the heating cavity 121 to recycle the hot air and cool down the compressor of the refrigeration device 110.

In some embodiments, the hot air inlet and the rotating fan blades may be oppositely arranged. For example, the hot air inlet and the rotating fan blades may be disposed at a top and a bottom of the heating cavity 121, respectively. As another example, the hot air inlet and the rotating fan blades may be disposed at a left side and a right side of the heating cavity 121, respectively. As another example, the hot air inlet and the rotating fan blades may be disposed at two diagonal corners of the heating cavity 121, respectively.

In some embodiments, the rotating fan blades may operate at a low speed, resulting in a low airflow velocity at the hot air inlet. The low-speed airflow of the hot air may form a circulation and facilitate drying the foodstuff.

In some embodiments, by oppositely arranging the hot air inlet and the rotating fan blades, the hot air entering the heating cavity 121 from the hot air inlet may form a circulating hot airflow inside the heating cavity 121. Meanwhile, the flowing hot air may accelerate the drying of the foodstuff.

In some embodiments, a left end and a right end of the heating cavity 121 may be provided with a slanting cavity 123, respectively.

In some embodiments, the slanting cavity 123 disposed at the right end of the heating device 120 may correspond to a left end of the second conveyor belt 140. A right end of the second conveyor belt 140 may correspond to the refrigeration device 110.

In some embodiments, a left end of the refrigeration device 110 may be provided with a slanting cavity 123. The slanting cavity 123 may correspond to the right end of the second conveyor belt 140.

In some embodiments, an inlet port and an outlet port of the heating cavity 121 may be provided as the slanting cavities 123, respectively, and the inlet port of the refrigeration device 110 may also be provided as the slanting cavity 123, so that the foodstuff may be moved from a relatively high position to a relatively low position in a direction from the inlet port to the outlet port due to the gravity.

In some embodiments, more than two blocking devices 130 may be disposed in the slanting cavity 123 disposed at the left end and the right end of the heating device 120 and the slanting cavity 120 disposed at the left end of the refrigeration device 110, respectively. The more than two blocking devices 130 may be used to block the heating cavity 121 or the refrigeration device 110, thereby preventing the hot air or cold air from flowing out of the slanting cavity 123 disposed at the left end and the right end of the heating device 120 and the slanting cavity 120 disposed at the left end of the refrigeration device 110, and ensuring the heating or cooling effect in the heating cavity 121 or the refrigeration device 110.

Figure 2:
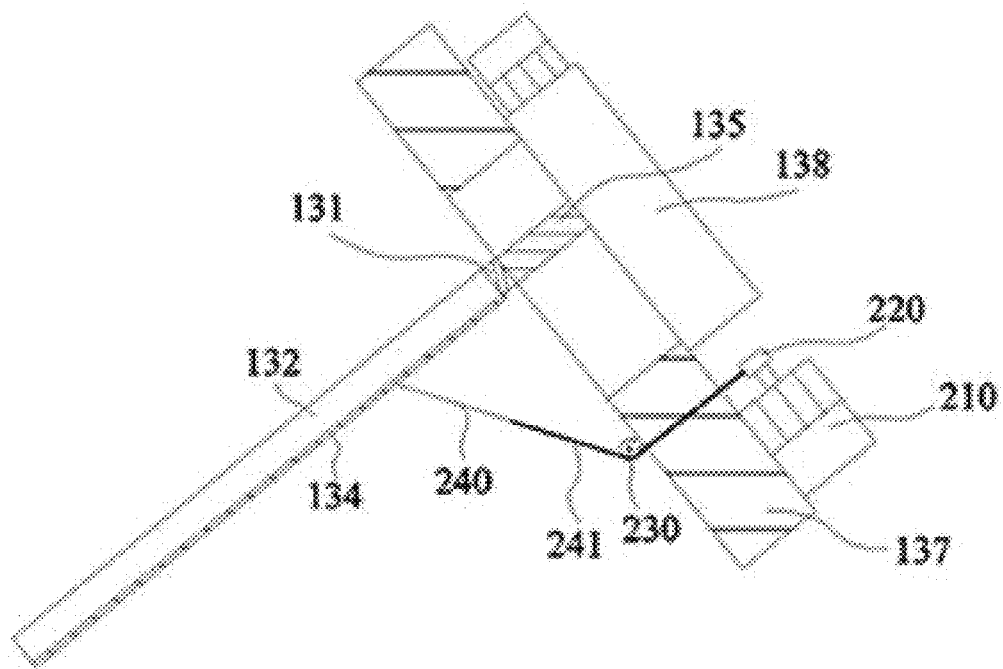
FIG. 2 is a main view illustrating more than two blocking devices according to some embodiments of the present disclosure.
Figure 3:
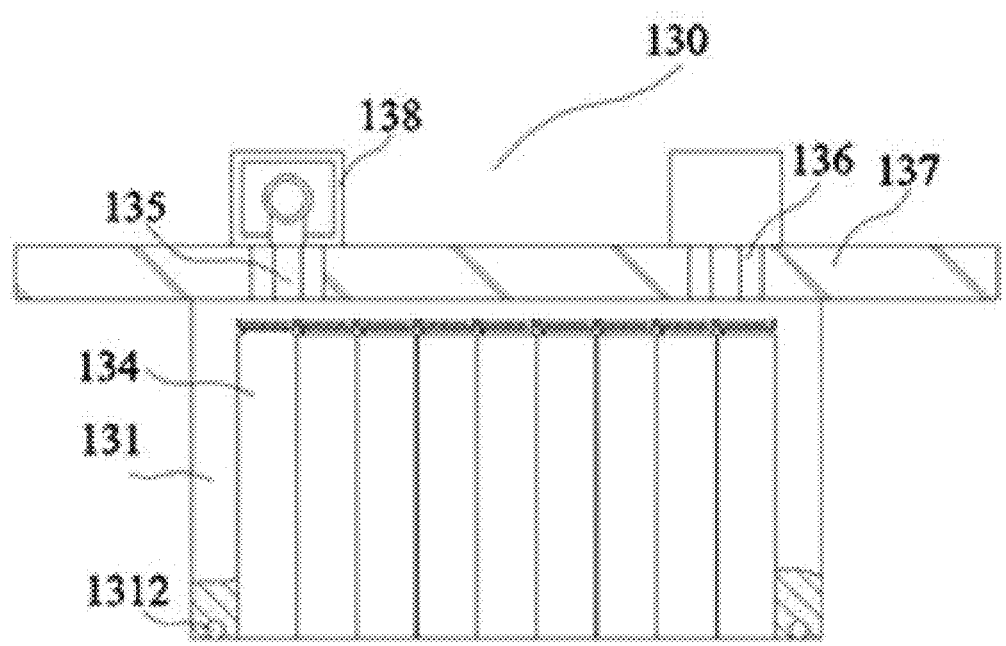
FIG. 3 is a side view illustrating more than two blocking devices according to some embodiments of the present disclosure.

FIG. 2 is a main view illustrating more than two blocking devices according to some embodiments of the present disclosure. FIG. 3 is a side view illustrating more than two blocking devices according to some embodiments of the present disclosure.

As illustrated in FIGS. 2-3, in some embodiments, each of the more than two blocking devices 130 may include a baffle plate 131. A middle of the baffle plate 131 may be provided with a through-groove 132. A top end of a right side of the baffle plate 131 may be hinged with a plurality of blocking strips 134 through a plurality of torsion springs 133, respectively. The plurality of blocking strips 134 may cover a cross-section of the through-groove 132.

In some embodiments, when the foodstuff passes through the through-groove 132, the foodstuff may prop open the plurality of blocking strips 134 covering the through-groove due to the gravity, and slide down from the slanting cavity 123 disposed at the right end of the heating cavity 121. By providing the plurality of blocking strips 134, the sliding speed of the foodstuff may be slowed down to prevent damage to the foodstuff caused by falling too fast. In addition, one end of each of the plurality of blocking strips 134 may be connected to one of the plurality of torsion springs 133, so that the plurality of blocking strips 134 may quickly be reset after the foodstuff passes through the plurality of blocking strips 134. In this way, an airtightness of the more than two blocking devices 130 is ensured, thereby reducing heat transfer between the heating cavity 121 and the outside or between the refrigeration device 110 and the outside, maintaining the temperature inside the heating cavity 121 or the refrigeration device 110, and saving energy.

In some embodiments, the more than two blocking devices 130 may be disposed in the slanting cavity 123 disposed at the left end and the right end of the heating device and the slanting cavity 123 disposed at the left end of the refrigeration device. In this case, when one of the more than two blocking devices 130 is open, the other one or more of the more than two blocking devices 130 may be closed to better ensure the airtightness of the more than two blocking devices 130, and further save energy.

As illustrated in FIG. 2, in some embodiments, a top end of the baffle plate 131 may be connected with a plurality of connecting blocks 135. The connecting blocks 135 may be disposed in a long groove 136. The long groove 136 may be disposed in a mounting plate 137. The connecting blocks 135 may be configured to penetrate through the long groove 136 and to be connected with a plurality of linear actuators 138. The linear actuators 138 are capable of driving the baffle plate 131 to move along the slanting cavity 123 disposed at the left end and the right end of the heating device 120 and the slanting cavity 123 disposed at the left end of the refrigeration device 110.

A linear actuator refers to a device that converts energy into linear motion, such as an electric cylinder, a pneumatic cylinder, a hydraulic cylinder, etc.

In some embodiments, when the foodstuff is sliding down, energy loss occurs due to frictional resistance between the falling foodstuff and the slanting cavity 123 disposed at the left end and the right end of the heating device 120 and the slanting cavity 123 disposed at the left end of the refrigeration device 110, which may not generate enough momentum for the foodstuff to pass through the plurality of blocking strips 134, resulting in the foodstuff being blocked by the plurality of blocking strips 134. Accordingly, the linear actuators 138 may be provided to drive the connecting blocks 135 to move within the long groove 136, which in turn drives the baffle plate 131 to move within the slanting cavity 123 disposed at the left end and the right end of the heating device 120 and the slanting cavity 123 disposed at the left end of the refrigeration device 110. The foodstuff may remain stationary with respect to the slanting cavity 123 disposed at the left end and the right end of the heating device 120 and the slanting cavity 123 disposed at the left end of the refrigeration device 110 due to on the static friction between the foodstuff and an inner wall of the slanting cavity 123 disposed at the left end and the right end of the heating device 120 and the slanting cavity 123 disposed at the left end of the refrigeration device 110. Meanwhile, the plurality of blocking strips 134 may be actively moved close to the inlet port of the slanting cavity 123, causing the foodstuff to continue falling through the plurality of blocking strips 134.

In some embodiments, after the stuck foodstuff passes through the plurality of blocking strips 134, the linear actuators 138 may also drive the plurality of blocking strips 134 to move in a direction away from the inlet port of the slanting cavity 123, which may cause the baffle plate 131 to reset to prepare for a next operation of making the foodstuff to pass through.

In some embodiments, the linear actuators 138 may be fixedly mounted on a mounting plate 137. A mounting cavity 124 may be provided above the slanting cavity 123. A partition plate 125 may be provided 125 between the mounting cavity 124 and the slanting cavity 123 disposed at the left end and the right end of the heating device 120 and between the mounting cavity 124 and the slanting cavity 123 disposed at the left end of the refrigeration device 110, respectively. The mounting plate 137 may be mounted on the partition plate 125. The linear actuators 138 may be disposed in the mounting cavity 124.

In some embodiments, the linear actuator 138 may be disposed in the mounting cavity 124 by mounting the mounting plate on the partition plate 125, so that the more than two blocking devices 130 can be directly removed from the mounting cavity 124, thereby facilitating mounting, removal, maintenance, and replacement of the more than two blocking devices 130.

In some embodiments, a plurality of layers of first conveyor belts 122 may be provided. The plurality of layers of first conveyor belts 122 may be staggered, and transmission directions of two adjacent layers of first conveyor belts 122 may be opposite. In this case, when the foodstuff is transferred through the plurality of layers of first conveyor belts 122, the foodstuff may be transferred layer by layer from a topmost layer of first conveyor belt 122 to a next layer of first conveyor belt 122, causing the foodstuff to flip as the foodstuff falls from a previous layer of first conveyor belt 122 to a latter layer of first conveyor belt 122.

In some embodiments, the foodstuff can be flipped by providing the plurality of layers of first conveyor belts 122, thereby achieving uniform heating and thorough drying of the foodstuff, and preventing overheating and deterioration of the foodstuff as well as adhesion between the foodstuff and the conveyor belt due to continuous uneven heating.

As illustrated in FIG. 2, in some embodiments, a motor 210 may be mounted on a top surface of the mounting plate 137. A rotating shaft of the motor 210 may be sleeved with a sleeve 220. A pulley 230 may be mounted on a bottom surface of the mounting plate 137. A pull rope 240 may be connected to a right side of each of the plurality of blocking strips 134. The plurality of pull ropes 240 may be connected to a main rope 241. The main rope 241 may be configured to wrap around the pulley 230, pass through the mounting plate 137, and wrap on the sleeve 220.

It should be understood that in some embodiments, even if the linear actuators 138 are used to drive the baffle plate 131 to move along the slanting cavity 123 disposed at the left end and the right end of the heating device 120 and the slanting cavity 123 disposed at the left end of the refrigeration device 110, the stuck foodstuff may not be released. Therefore, by shortening the main rope 241 by rotating the main rope 241 with the motor 210 and pulling open the plurality of blocking strips 134 with the plurality of pulling ropes 240, the foodstuff may pass through the plurality of blocking strips 134 smoothly. In some embodiments, sensors may also be disposed at the plurality of blocking strips 134 or the inner wall of the slanting cavity 123 disposed at the left end and the right end of the heating device 120 and the slanting cavity 123 disposed at the left end of the refrigeration device 110 to detect whether the foodstuff is stuck at the plurality of blocking strips 134. For example, the sensors may include a photoelectric sensor, a pressure sensor, a proximity sensor, or a visual detection system, etc.

As illustrated in FIG. 2, in some embodiments, a left end, a right end, and a bottom end of the through-groove 132 may be open, and the through-groove 132 may be in a shape of n. In this case, bottom ends of the plurality of blocking strips 134 may be contacted with a bottom surface of the slanting cavity 123 disposed at the left end and the right end of the heating device 120 and a bottom surface of the slanting cavity 123 disposed at the left end of the refrigeration device 110, thereby facilitating the foodstuff to prop open the plurality of blocking strips 134.

Figure 4:
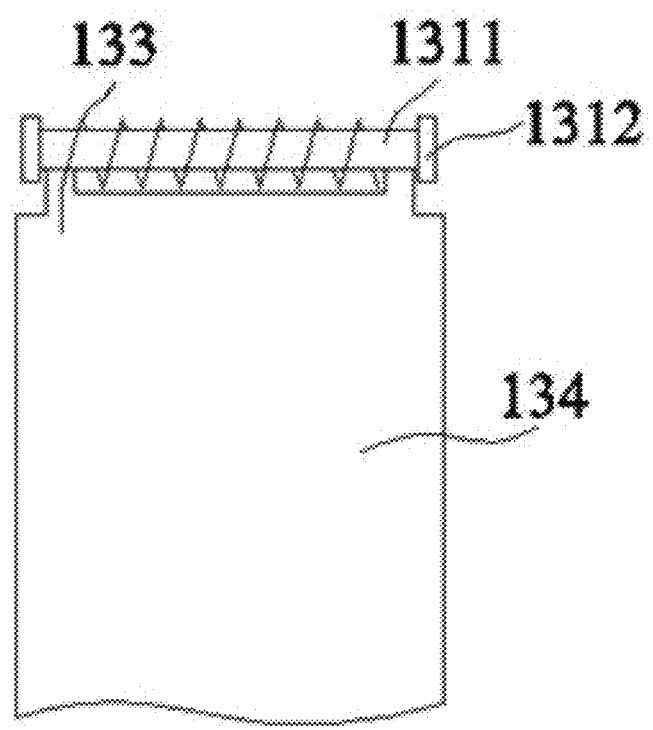
FIG. 4 is a schematic diagram illustrating structures of a plurality of blocking strips according to some embodiments of the present disclosure.

FIG. 4 is a schematic diagram illustrating structures of a plurality of blocking strips according to some embodiments of the present disclosure.

As illustrated in FIGS. 3-4, in some embodiments, a top end of a right side of the baffle plate 131 may be provided with a plurality of convex blocks 1312. A plurality of rotating rods 1311 may be provided between the plurality of convex blocks 1312, respectively. Top ends of the plurality of blocking strips 134 may be fixedly connected with the plurality of rotating rods 1311, respectively. The plurality of torsion springs 133 may be configured to sleeve on the plurality of rotating rods 1311, and the plurality of torsion springs 133 are capable of resetting the plurality of blocking strips 134.

In some embodiments, by providing the plurality of rotating rods 1311 between the plurality of convex blocks 1312 when the plurality of blocking strips 134 rotate, the plurality of rotating rods 1311 may rotate synchronously with the plurality of blocking strips 134 since the top ends of the plurality of blocking strips 13 are fixedly connected with the plurality of rotating rods 1311, while two ends of each of the plurality of rotating rods 1311 may rotate relative to the plurality of convex blocks 1312. Since one end of each of the plurality of torsion springs 133 is fixedly connected with each of the plurality of convex blocks 1312 and the other end of each of the plurality of torsion springs 133 is fixedly connected with each of the plurality of blocking strips 134 or each of the plurality of rotating rods 1311, the plurality of torsion springs 133 may be twisted and may be used to store energy when the foodstuff pushes the plurality of blocking strips 134 to rotate. When the foodstuff passes through the plurality of blocking strips 134, the energy stored by the plurality of torsion springs 133 may be released to reset the plurality of blocking strips 134, thereby blocking the foodstuff when the foodstuff contacts the plurality of blocking strips 134 next time.

In some embodiments, torsion force of the plurality of torsion springs 133 may be self-set according to actual usage. For example, when the torsion force of the plurality of torsion springs 133 is too high to the foodstuff to pass through the plurality of blocking strips 134, a user may reduce the torsion force of the plurality of torsion springs 133 to facilitate the passage of the foodstuff. As another example, when the torsion force of the plurality of torsion springs is too small to make the plurality of blocking strips 134 parallel with the baffle plate 131, the user may increase the torsion force of the plurality of torsion springs 133, so that the plurality of blocking strips 134 may cover the cross-section of the slanting cavity 123 exactly.

As illustrated in FIG. 3, in some embodiments, a plurality of rolling balls 1313 may be disposed on a bottom surface of the baffle plate 131. The plurality of rolling balls 1313 may be configured to be attached to the bottom surface of the slanting cavity 123 disposed at the left end and the right end of the heating device 120 and the bottom surface of the slanting cavity 123 disposed at the left end of the refrigeration device 110.

In some embodiments, a friction in a movement of the baffle plate 131 along the slanting cavity 123 disposed at the left end and the right end of the heating device 120 and the slanting cavity 123 disposed at the left end of the refrigeration device 110 may be reduced by providing the plurality of rolling balls 1313 on the bottom surface of the baffle plate 131.

As illustrated in FIG. 3, in some embodiments, the top end of the baffle plate 131 may correspond to two connecting blocks 135. One end of each of the two connecting blocks 135 away from the baffle plate 131 may be connected with an output end of each of the linear actuators 138.

The top end of the baffle plate 131 may correspond to the two connecting blocks 135. The two linear actuators 138 may drive the baffle plate 131 to move at different positions of the baffle plate 131 simultaneously, thereby making the movement of the baffle plate 131 more stable.

In some embodiments, the linear actuators 138 are capable of blocking the long groove 136. That is, widths of the linear actuators 138 are greater than a width of the long groove 136, thereby preventing cold air or hot air from entering the mounting cavity 124 to cause heat exchange, reducing heat dissipation within the heating cavity 121 or the refrigeration device 110, and saving energy.

As illustrated in FIG. 1, a top of the mounting cavity 124 may be provided with a cavity door 1241. The cavity door 1241 may be opened or closed to allow the user to enter the mounting cavity 124 for installation, removal, maintenance, and replacement of the more than two blocking device 130.

In some embodiments, the combined device may further include a mounting frame 141. The second conveyor belt 140 may be mounted on the mounting frame 141. In this case, a height of the second conveyor belt 140 may be lower than or equal to the outlet port of the heating device 120 and higher than or equal to the inlet port of the refrigeration device 110, thereby facilitating transferring of the foodstuff.

In some embodiments, the combined device may include a processor configured to process data related to functions of the combined device and control the combined device.

In some embodiments, the combined device may further include at least one temperature sensor configured to obtain temperature data. The at least one temperature sensor may be in communication connection with the processor.

The at least one temperature sensor may be disposed at a plurality of positions of the heating device 120, such as inside the heating cavity 121 and the slanting cavity 123. In some embodiments, the processor may control power of the heating plate 126 to heat the foodstuff to a more appropriate temperature based on the temperature data of the heating cavity 121. In some embodiments, the at least one temperature sensor may be provided above the first conveyor belt 122 within the heating cavity 121 to better detect the temperature of the foodstuff.

In some embodiments, the combined device may further include at least one image sensor configured to acquire image data. The at least one image sensor may be in communication connection with the processor.

In some embodiments, the at least one image sensor may be provided above the first conveyor belt 122 or the second conveyor belt 140 to monitor a transmission speed of the first conveyor belt 122 or the second conveyor belt 140, thereby adjusting the transmission speed of the first conveyor belt 122 or the second conveyor belt 140 to control an amount of time the foodstuff spends inside the heating device 120 or an amount of time the foodstuff spends on the second conveyor belt 140, to achieve a desired drying and sterilizing effect. More details may be found in the descriptions hereinafter.

In some embodiments, the at least one image sensor may obtain image data of the foodstuff, thereby obtaining features related the foodstuff (e.g., a foodstuff type, a particle size, etc.) to determine operation parameters of the combined device. More details may be found in the descriptions hereinafter.

In some embodiments, the combined device may further include at least two foodstuff moisture detection devices which are in communication connection with the processor. In some embodiments, the at least two foodstuff moisture detection devices may be arranged at the inlet port and the outlet port of the heating cavity 121, respectively, to measure a current dryness (i.e., a moisture content) of the foodstuff.

In some embodiments, the at least two foodstuff moisture detection devices may include an inlet transmissive microwave moisture measurement device and an outlet transmissive microwave moisture measurement device which are arranged at the slanting cavity 123 disposed at the left end and the heating cavity 121 disposed at the right end of the heating cavity 121, respectively.

The present disclosure also provides a use method of a combined refrigeration and heating device for food industry. The use method may be implemented on the combined refrigeration and heating device for the food industry. The use method may include the following operations.

A foodstuff may be delivered from the slanting cavity 123 disposed at the left end of the heating device 120. The foodstuff may be configured to prop open the plurality of blocking strips 134 due to gravity, and fall onto the first conveyor belt 122 inside the heating cavity 121. The first conveyor belt 122 may be configured to convey the foodstuff, and the heating plate 126 may be configured to perform a sterilizing and drying operation on the foodstuff.

The foodstuff may be conveyed to the slanting cavity 123 disposed at the right end of the heating device 120 through the first conveyor belt 122. The foodstuff may be configured to prop open the plurality of blocking strips 134 due to the gravity, and fall onto the second conveyor belt 140. The second conveyor belt 140 may be configured to convey and cool the foodstuff.

The foodstuff may be conveyed to the slanting cavity 123 disposed at the left end of the refrigeration device 110 through the second conveyor 140. The foodstuff may be configured to prop open the plurality of blocking strips 134 due to the gravity, and enter into the refrigeration device 110 for freezing or refrigerating.

According to the method described in some embodiments of the present disclosure, the foodstuff is subjected to freezing or refrigerating after the sterilizing and drying operation is performed on the foodstuff, and the heat generated during freezing or refrigerating is recycled as waste heat and utilized in the sterilizing and drying operation, which is convenient and economical.

In some embodiments, when the foodstuff props open the plurality of blocking strips 134, the linear actuators 138 may be configured to drive the baffle plate 131 to move back and forth along the slanting cavity 123 to prevent the foodstuff from being stuck, and to speed up a process for propping the foodstuff open.

It should be understood that if the foodstuff is stuck, the motor 210 may rotate to draw the main rope 241 and pull open the plurality of blocking strips 134 by the plurality of pull ropes 240, so that the foodstuff may smoothly pass through the plurality of blocking strips 134.

In some embodiments, the processor may adjust heating power of the heating plate 126 based on a current temperature of the heating cavity 121, the particle size of the foodstuff, and a drying temperature required by the foodstuff.

For example, when the at least one temperature sensor detects that the temperature of the heating cavity 121 is higher than a preset temperature threshold, the processor may control the heating plate 126 to reduce the power to maintain an equalized temperature within the heating cavity 121. As another example, when the particle size of the foodstuff is too large, the processor may control the heating plate 126 to increase the power to adequately heat and dry the foodstuff. As another example, when the foodstuff type is specific and requires a specific drying temperature (e.g., low-temperature drying), the processor may control the heating power of the heating plate 126 to maintain the temperature in the heating cavity 121 within a specific range.

The particle size of the foodstuff refers to a physical size of the foodstuff, which may be found in the descriptions hereinafter.

The drying temperature required by the foodstuff refers to the drying temperature set according to the needs of a foodstuff process.

In some embodiments, the drying temperature required by the foodstuff may be based on historical data or priori empirical defaults, or may be input by an operator via an operator panel.

In some embodiments, the heating device 120 may adjust the heating power of the heating plate 126 based on a plurality of algorithms. For example, a multivariable system of the temperature of the heating cavity 121, the particle size of the foodstuff, and the drying temperature required by the foodstuff may be controlled by processing uncertainty and ambiguity using a fuzzy logic algorithm. As another example, an optimal heating power setting may be automatically searched for an optimal drying effect by modeling natural selection and genetic mechanisms based on genetic algorithms.

In some embodiments, when other heating devices are provided, such as an electric heater, in the heating device 120, the heating device 120 may adjust the heating power of all the heating devices to adjust the temperature within the heating cavity 121 to a target temperature.

In some embodiments, the processor may determine the heating power of the heating plate 126, a first transmission speed of the first conveyor belt 122, and a second transmission speed of the second conveyor belt 140 based on the image data obtained by the at least one image sensor and the temperature data obtained by the at least one temperature sensor.

In some embodiments, the processor may determine the heating power of the heating plate 126 and the first transmission speed of the first conveyor belt 122 based on the image data and the temperature data by using a first effect prediction model.

The first effect prediction model refers to a machine learning model that predicts a sterilizing effect and a drying effect of the heating device 120. In some embodiments, the first effect prediction model may be any one or any combination of a deep neural network (DNN) or another customized model structure.

In some embodiments, an input of the first effect prediction model may include a foodstuff type of a foodstuff to be treated, a particle size of the foodstuff to be treated, and a plurality of candidate parameter sets, and an output of the first effect prediction model may include estimated sterilizing effects and estimated drying effects corresponding to the plurality of candidate parameter sets.

The foodstuff to be treated refers to a foodstuff to be treated by the combined device, such as a foodstuff to be sterilized and a foodstuff to be dried. The foodstuff to be treated may be refrigerated or frozen after being sterilized and dried.

The foodstuff type of the foodstuff to be treated refers to a type of the foodstuff to be treated, such as a vegetable, meat, a grain, etc. The particle size of the foodstuff to be treated refers to a physical size of the foodstuff to be treated, such as a length, a width, a thickness, etc.

In some embodiments, the processor may determine the foodstuff type of the foodstuff to be treated and the particle size of the foodstuff to be treated based on the image data.

In some embodiments, the processor may determine the foodstuff type of the foodstuff to be treated and the particle size of the foodstuff to be treated based on the image data using various manners. For example, the processor may determine the foodstuff type of the foodstuff to be treated and the particle size of the foodstuff to be treated using a conventional computer vision approach, such as edge detection, color analysis, shape matching, or the like. As another example, the processor may determine the foodstuff type of the foodstuff to be treated and the particle size of the foodstuff to be treated using a machine learning model, such as a convolutional neural network (CNN), a support vector machine (SVM), or the like.

The candidate parameter sets refer to candidate operation parameters of the combined device.

In some embodiments, the processor may generate the plurality of candidate parameter sets. Each of the plurality of candidate parameter sets may include candidate heating power for the heating plate 126 and a candidate first transmission speed for the first conveyor belt 122.

In some embodiments, the processor may generate the plurality of candidate parameter sets in various manners. For example, a plurality of similar candidate parameter sets may be generated based on historical data and prior experience by analyzing effective parameters (e.g., the heating power and the speed of the conveyor belt) used in previous treatment of similar foodstuffs. As another example, heating power and transmission speeds within a certain range may be selected as the plurality of candidate parameter sets based on factors such as the foodstuff type and the particle size.

In some embodiments, the processor may predict an estimated sterilizing effect and a estimated drying effect corresponding to each of the plurality of candidate parameter sets by using the first effect prediction model. Then the processor may determine a target parameter set based on the estimated sterilizing effect and the estimated drying effect corresponding to each of the plurality of candidate parameter sets, and determine the heating power and the first transmission speed in the target parameter set as the heating power of the heating plate 126 and the first transmission speed of the first conveyor belt 122.

In some embodiments, the processor may use the candidate parameter set corresponding to the estimated sterilizing effect and the estimated drying effect that satisfy a predetermined condition as the target parameter set. For example, the estimated sterilizing effect and the estimated drying effect may be expressed as a value from 0 to 10, and the processor may use a candidate parameter set corresponding to a largest sum of the estimated sterilizing effect and the estimated drying effect as the target parameter set.

In some embodiments, the first effect prediction model may be trained in various ways based on a large number of first training samples with first labels. For example, the first effect prediction model may be trained in various ways such as gradient descent or adaptive learning rate.

In some embodiments, the first training samples may include sample foodstuff types of foodstuffs to be treated, sample particle sizes of foodstuffs to be treated, and sample parameter sets. The first training samples may be obtained based on historical data. The first labels corresponding to the first training samples may include an actual sterilizing effect and an actual drying effect corresponding to the first training samples. The first labels may be obtained in various ways, such as manual labeling.

In some embodiments, the actual sterilizing effect corresponding to the first training samples may be obtained by quantitative assay of bacteria. Specifically, a lab technician may sample the first training samples to obtain a first bacterial sample before the first training samples enter the first conveyor belt. The lab technician may sample the first training samples to obtain a second bacterial sample after the first training samples come out of the first conveyor belt. By counting the bacteria in the first bacterial sample and the second bacterial sample, a difference in a count of bacteria before and after the first training samples enter the first conveyor belt may be obtained, and the difference in the count of bacteria may be taken as the actual sterilizing effect of the first training samples.

In some embodiments, the actual drying effect corresponding to the first training samples may be obtained by a moisture content test. Specifically, a tester may sample the first training samples to obtain a first dry sample before the first training samples enter the first conveyor belt. The tester may sample the first training samples to obtain a second dry sample after the first training samples come out of the first conveyor belt. By testing a moisture content of the first drying sample and the second drying sample, a difference in the moisture content before and after the first training samples enter the first conveyor belt may be obtained, and the difference in the moisture content may be taken as the actual drying effect of the first training samples.

In some embodiments, the sterilizing effect and the drying effect can be estimated based on the plurality of candidate parameter sets by using the first effect prediction model, so that the target parameter set that meets the requirements for the sterilizing effect and the drying effect can be quickly and effectively selected, and the operation parameters of the combined device can be adjusted based on the target parameter set, thereby improving the operation efficiency of the device.

In some embodiments, the input of the first effect prediction model may also include first stacking features of the foodstuff to be treated on the first conveyor belt. By inputting the foodstuff type of the foodstuff to be treated, the particle size of the foodstuff to be treated, the first stacking features of the foodstuff to be treated, and the plurality of candidate parameter sets to the first effect prediction model, the estimated sterilizing effect and the estimated drying effect corresponding to each of the plurality of candidate parameter sets may be determined. In some embodiments, the first training samples of the first effect prediction model may also include sample first stacking features of the foodstuff to be treated on the first conveyor belt, which may be obtained based on historical data.

The first stacking features refer to a stacking situation of the foodstuff to be treated on the first conveyor belt 122. In some embodiments, the first stacking features may be represented by an average count of foodstuff particles stacked per unit area on the first conveyor belt 122.

The first stacking features may be obtained in various ways, such as image recognition or weighing. In some embodiments, the first stacking features may be obtained by recognizing an image of the foodstuff to be treated using a stacking feature recognition model.

The stacking feature recognition model refers to a model for recognizing a stacking situation of the foodstuff to be treated. In some embodiments, the stacking feature recognition model may be a machine learning model, such as a CNN.

In some embodiments, an input of the stacking feature recognition model may include surface images of the foodstuff to be treated on the first conveyor belt from a plurality of angles, and an output of the stacking feature recognition model may include the first stacking features of the foodstuff to be treated on the first conveyor belt.

In some embodiments, the surface images of the foodstuff to be treated on the first conveyor belt from the plurality of angles may be obtained by the at least one image sensor.

In some embodiments, the stacking feature recognition model may be trained based on a large number of second training samples with second labels.

In some embodiments, the second training samples may be sample surface images of the foodstuff to be treated on the first conveyor belt. Images of the foodstuff to be treated may be taken by manually arranging the foodstuff to be treated in different situations, and the images may be used as the second training samples. The second labels corresponding to the second training samples may be actual first stacking features of the foodstuff to be treated on the first conveyor belt, which may be obtained by manually counting a count of foodstuff particles per unit area. The count may be used as the second labels.

It is difficult to effectively sterilize the interior of the stacked foodstuff to be treated in case of a high stacking density of the foodstuff particles of the foodstuff to be treated. In addition, it is difficult to extract the moisture from the interior of the stacked foodstuff to be treated, and the time for drying the foodstuff to be treated is longer. By introducing the first stacking features, the heating power of the heating plate 126 and the first transmission speed of the first conveyor belt 122 can be adjusted by effectively recognizing the stacking situation of the foodstuff to be treated, so that the foodstuff to be treated can be thoroughly dried and sterilized.

In some embodiments, the processor may determine the second transmission speed of the second conveyor belt 140 based on a post-drying temperature of the foodstuff to be treated and an ambient temperature.

In some embodiments, the processor may generate a plurality of candidate second transmission speeds, and predict an estimated cooling sequence corresponding to each of the plurality of candidate second transmission speeds by using a second effect prediction model. The transmission speed of second conveyor belt 140 may be determined and adjusted accordingly based on the estimated cooling sequence corresponding to each of the plurality of candidate transmission speeds, thereby improving the operation efficiency of the device.

The second effect prediction model refers to a machine learning model that predicts the second transmission speed of the second conveyor belt 140. In some embodiments, the second effect prediction model may be any one or any combination of DNN, or the like.

In some embodiments, an input of the second effect prediction model may include the post-drying temperature of the foodstuff to be treated, the ambient temperature, the candidate second transmission speeds, and an output of the second effect prediction model may include the estimated cooling sequence.

The estimated cooling sequence refers to a sequence composed of a plurality of temperature values corresponding to a time period during which the foodstuff to be treated is conveyed from a start end of the second conveyor belt 140 to a terminal end of the second conveyor belt 140. The estimated cooling sequence may take various forms. In some embodiments, the estimated cooling sequence may be a sequence composed of a plurality of temperature values measured at equal time intervals.

The post-drying temperature of the foodstuff to be treated refers to a temperature of the foodstuff to be treated when the foodstuff to be treated just falls out of the terminal end of the slanting cavity 123 disposed at the right end of the heating device 120. In some embodiments, the post-drying temperature of the foodstuff to be treated may be obtained by the at least one temperature sensor provided at the terminal end of the slanting cavity 123 disposed at the right end of the heating device 120.

The ambient temperature refers to a temperature of an environment outside the combined device. The ambient temperature may be obtained in various ways, such as a temperature-controlled device in a thermostatic workshop or a temperature sensor. In some embodiments, the ambient temperature may be obtained by the at least one temperature sensor provided on an outer surface of the combined device.

In some embodiments, the second effect prediction model may be trained in various ways based on a large number of third training samples with third labels. For example, the second effect prediction model may be trained based on the gradient descent or the adaptive learning rate.

In some embodiments, the third training samples may be sample post-drying temperatures of the foodstuff to be treated, sample ambient temperatures, and sample second transmission speeds of the second conveyor belt. The third labels corresponding to the third training samples may be an actual temperature sequence corresponding to the third training samples. The third training samples and the third labels may be obtained based on historical data. The third labels may be manually labeled.

In some embodiments, the processor may select a candidate second transmission speed corresponding to an estimated cooling sequence satisfying predetermined cooling requirements as the transmission speed of the second transmission belt 140. For example, the processor may select a candidate second transmission speed corresponding to a greatest average change in magnitude of the plurality of temperature values of the estimated cooling sequence as the transmission speed of the second drive belt 140. For example, the processor may select a plurality of estimated cooling sequences in which the average change in magnitude of the plurality of temperature values is within a predetermined change range, compare candidate second transmission speeds corresponding to the plurality of estimated cooling sequences, and select a fastest candidate second transmission speed of the plurality of candidate second transmission speeds as the transmission speed of the second transmission belt 140, thereby improving the production efficiency.

In some embodiments, the transmission speed of the second transmission belt satisfying the requirements can be quickly and effectively selected by predicting the estimated cooling sequence based on the plurality of candidate second transmission speeds by using the second effect prediction model.

In some embodiments, the input of the second effect prediction model may further include second stacking features of the foodstuff to be treated on the second conveyor belt. Similar to the first stacking features, the second stacking features may also be obtained by the stacking feature recognition model. More descriptions regarding the stacking feature recognition model may be found in the above descriptions. In some embodiments, the third training samples of the second effect prediction model may further include sample second stacking features of the sample of the foodstuff to be treated on the second conveyor belt, which may be obtained based on historical data.

When the stacking density of the food particles of the foodstuff to be treated is relatively high, it may be difficult for a middle portion of the foodstuff to be treated to dissipate heat and evaporate moisture. By introducing the second stacking features, the foodstuff to be treated may be better cooled down on the second conveyor belt.

Furthermore, the indicated orientations or positional relationships described in the embodiments of the present disclosure are based on the orientations or positional relationships illustrated in the accompanying drawings, and are only intended to facilitate the description of the embodiments of the present disclosure and to simplify the description, and are not intended to indicate or imply that the referred devices or constructions must have a particular orientation or operate in a particular orientation configuration, and therefore are not to be construed as limitations of the embodiments of the present disclosure.

In the embodiments of the present disclosure, unless otherwise expressly specified and limited, the terms "connection" and "setup", or the like, are to be understood broadly, for example, they may refer to a fixed connection, a removable connection, or a one-piece connection; a mechanical connection or an electrical connection; a direct connection or an indirect connection through an intermediate medium; a connection within two components or an interactive relationship between two components. For those having ordinary skills in the art, the specific meaning of the above terms in the embodiments of the present disclosure may be understood based on the specific circumstances. In addition, the connection can be directly on another component or indirectly on that other component. When a component is said to be "connected" to another component, it may be directly connected to another component or indirectly connected to the other component.

It should be understand that the terms "length", "width", "top", "bottom", "front", "rear", "left", "right", "vertical", "horizontal", "top", "bottom", "inside", "outside", or the like, indicate orientations or positional relationships based on those illustrated in the accompanying drawings, and are intended only to facilitate the description and simplify the description of the embodiments of the present disclosure, and do not indicate or imply that the device or component referred to must have a particular orientation, be constructed and operated with a particular orientation; therefore, they should not be understood as limitations on the embodiments of the present disclosure.

The foregoing is only a preferred embodiment of the embodiments of the present disclosure and should not be construed as limiting the embodiments of the present disclosure. It should be noted that, for those having ordinary skills in the art, various modifications and variations can be made without departing from the technical principles of the embodiments of the present disclosure, and these modifications and variations should also be considered within the scope of protection of the embodiments of the present disclosure.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A combined refrigeration and heating device for food industry, comprising: a refrigeration device connected with a heating device through a waste heat recovery and utilization system, wherein the heating device is provided with a heating cavity, a first conveyor belt being disposed in the heating cavity, a top surface of the heating cavity being provided with a heating plate, the heating plate being configured to cooperate with the waste heat recovery and utilization system, and a left end and a right end of the heating cavity being provided with a slanting cavity, respectively;

the slanting cavity disposed at the right end of the heating device is provided with a second conveyor belt, and a right end of the second conveyor belt corresponds to the refrigeration device;
a left end of the refrigeration device is provided with a slanting cavity, and the slanting cavity corresponds to the right end of the second conveyor belt;
a refrigeration system is disposed in the refrigeration device, and the refrigeration system cooperates with the waste heat recovery and utilization system; and
more than two blocking devices are disposed in the slanting cavity disposed at the left end and the right end of the heating device and the slanting cavity disposed at the left end of the refrigeration device, respectively, wherein
for each of the more than two blocking devices,
the blocking device includes a baffle plate, a middle of the baffle plate is provided with a through-groove, a top end of a right side of the baffle plate is hinged with a plurality of blocking strips through a plurality of torsion springs, respectively, the plurality of blocking strips are capable of blocking the through-groove, a top end of the baffle plate is connected with a plurality of connecting blocks, the plurality of connecting blocks are disposed in a long groove, the long groove is disposed in a mounting plate, the plurality of connecting blocks are configured to penetrate through the long groove and to be connected with a plurality of linear actuators, and the plurality of linear actuators are capable of driving the baffle plate to move along the slanting cavity disposed at the left end and the right end of the heating device and the slanting cavity disposed at the left end of the refrigeration device;
the plurality of linear actuators are fixedly mounted on the mounting plate, a mounting cavity is provided above the slanting cavity disposed at the left end and the right end of the heating device and the slanting cavity disposed at the left end of the refrigeration device, respectively, a partition plate is provided between the mounting cavity and the slanting cavity disposed at the left end and the right end of the heating device and between the mounting cavity and the slanting cavity disposed at the left end of the refrigeration device, respectively, the mounting plate is mounted on the partition plate, and the plurality of linear actuators are disposed in the mounting cavity.

2. The device of claim 1, wherein a motor is mounted on a top surface of the mounting plate, a rotating shaft of the motor is sleeved with a sleeve, a pulley is mounted on a bottom surface of the mounting plate, a pull rope is connected to a right side of each of the plurality of blocking strips, the plurality of pull ropes are connected to a main rope, and the main rope is configured to wrap around the pulley, pass through the mounting plate, and wrap on the sleeve.

3. The device of claim 2, wherein a left end, a right end, and a bottom end of the through-groove are open, and the through-groove is in a shape of n.

4. The device of claim 3, wherein
the top end of the right side of the baffle plate is provided with a plurality of convex blocks, a plurality of rotating rods are provided between the plurality of convex blocks, respectively,
top ends of the plurality of blocking strips are fixedly connected with the plurality of rotating rods, respectively, and
the plurality of torsion springs are configured to sleeve on the plurality of rotating rods, and the plurality of torsion springs are capable of resetting the plurality of blocking strips.

5. The device of claim 4, wherein a plurality of rolling balls are disposed on a bottom surface of the baffle plate, and the plurality of rolling balls are configured to be attached to a bottom surface of the slanting cavity disposed at the left end and the right end of the heating device and a bottom surface of the slanting cavity disposed at the left end of the refrigeration device.

6. The device of claim 5, wherein the top end of one baffle plate corresponds to two connecting blocks disposed in the long groove, and the plurality of linear actuators are capable of blocking the long groove.

7. The device of claim 6, wherein the mounting cavity is provided with a cavity door.

8. The device of claim 7, wherein the second conveyor belt is mounted on a mounting frame.

9. A use method of a combined refrigeration and heating device for food industry, implemented on the combined refrigeration and heating device for the food industry of claim 1, comprising:
delivering a foodstuff from the slanting cavity disposed at the left end of the heating device, wherein the foodstuff is configured to prop open the plurality of blocking strips due to gravity, and fall onto the first conveyor belt inside the heating cavity, the first conveyor belt is configured to convey the foodstuff, and the heating plate is configured to perform a sterilizing and drying operation on the foodstuff;
conveying the foodstuff to the slanting cavity disposed at the right end of the heating device through the first conveyor belt, wherein the foodstuff is configured to prop open the plurality of blocking strips due to the gravity, and fall onto the second conveyor belt, the second conveyor belt is configured to convey and cool the foodstuff; and
conveying the foodstuff to the slanting cavity disposed at the left end of the refrigeration device through the second conveyor belt, wherein the foodstuff is configured to prop open the plurality of blocking strips due to the gravity, and enter into the refrigeration device for freezing or refrigerating.

10. The use method of claim 9, wherein when the plurality of blocking strips are propped open through the foodstuff, the plurality of linear actuators are configured to drive the baffle plate to move back and forth along the slanting cavity disposed at the left end and the right end of the heating device and the slanting cavity disposed at the left end of the refrigeration device to prevent the foodstuff from being stuck, and to speed up a process for propping the foodstuff open.

* * * * *